(12) United States Patent
Chen et al.

(10) Patent No.: US 7,940,951 B2
(45) Date of Patent: May 10, 2011

(54) SILENT HEAT DISSIPATION DEVICE

(75) Inventors: Han-Ting Chen, Hsin Chu Shien (TW); Yun-Liang Hsieh, Tao Yuan Shien (TW); Jung-Wen Chang, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 1227 days.

(21) Appl. No.: 11/589,107

(22) Filed: Oct. 30, 2006

(65) Prior Publication Data

US 2008/0075317 A1    Mar. 27, 2008

(30) Foreign Application Priority Data

Sep. 11, 2006 (TW) .............................. 95133538 A

(51) Int. Cl.
*H04R 25/00* (2006.01)

(52) U.S. Cl. ....................................... 381/397; 381/124

(58) Field of Classification Search .................. 381/345, 381/349, 397, 396, 124
See application file for complete search history.

(56) References Cited

U.S. PATENT DOCUMENTS

| | | | | |
|---|---|---|---|---|
| 6,079,515 A | * | 6/2000 | Newman | 181/156 |
| 6,259,798 B1 | * | 7/2001 | Perkins et al. | 381/397 |
| 7,039,212 B2 | * | 5/2006 | Poling et al. | 381/349 |

FOREIGN PATENT DOCUMENTS

JP    2005-136250 A    5/2005

\* cited by examiner

*Primary Examiner* — Suhan Ni
(74) *Attorney, Agent, or Firm* — Rabin & Berdo, PC

(57) ABSTRACT

A heat dissipation device includes a hollow housing and a speaker. The hollow housing has a first opening and a second opening. The speaker is disposed at the first opening, wherein the speaker includes a diaphragm oscillating within a frequency scope the human ear cannot or hardly hear so as to generate airflow through the second opening.

11 Claims, 1 Drawing Sheet

SILENT HEAT DISSIPATION DEVICE

RELATED APPLICATIONS

The present application is based on, and claims priority from, Taiwan Application Serial Number 95133538, filed on Sep. 11, 2006, the disclosure of which is hereby incorporated by reference herein in its entirety.

BACKGROUND

1. Field of Invention

The present invention relates to a heat dissipation device.

2. Description of Related Art

As the information technology and computer industry advances, portable electronic apparatuses, such as notebook computers, and other precise instruments are more widely used. Owing to demands for convenience and practicality, the portable electronic product is designed to be lighter, thinner, shorter, and smaller. For example, a notebook PC is required to be lighter, thinner and powerful in computing performance.

Because of the requirement of lighter, thinner, shorter, and smaller for portable electronic apparatuses, components therein face a heat dissipation problem. The mainstream framework of heat dissipation design in a portable electronic apparatus, i.e. a notebook computer, is forced heat convection via a centrifugal fan.

Once heat dissipation efficiency is enhanced, airflow is essentially accelerated. The stronger the airflow is, the more turbulent the wake flow is. Thus, notebook PC manufacturers face a challenge between reducing noise and improving overall heat dissipation efficiency.

SUMMARY

A heat dissipation device includes a hollow housing and a speaker. The hollow housing has a first opening and a second opening. The speaker is disposed at the first opening, wherein the speaker includes a diaphragm oscillating within a frequency scope the human ear cannot or hardly hear so as to generate airflow through the second opening.

A heat dissipation device is described. A hollow housing has a first opening and a second opening. A diaphragm having a magnet is disposed at the first opening. A magnetic circuit means for oscillating the diaphragm within a frequency scope the human ear cannot or hardly hear is disposed inside the hollow housing so as to generate airflow through the second opening.

A method for heat dissipating is described. A hollow housing having a first opening and a second opening is provided. A speaker is disposed at the first opening. A diaphragm of the speaker is oscillated within a frequency scope the human ear cannot or hardly hear so as to generate airflow through the second opening.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
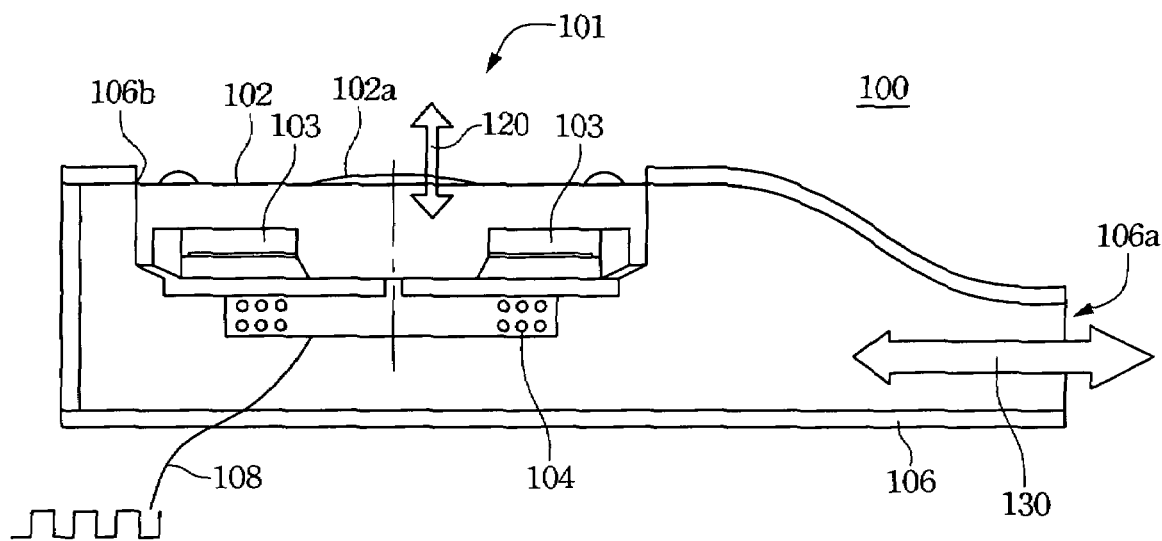
FIG. 1 illustrates a cross sectional view of a heat dissipation device according to one embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates a cross sectional view of a heat dissipation device according to one embodiment of this invention. The heat dissipation device 100 includes a hollow housing 106 and a speaker 101. The housing 106 has an opening 106a and an opening 106b. The speaker 101 is disposed at the opening 106b, and electrically connected to a frequency signal source by a signal cable 108. When the speaker 101 is driven by the frequency signal source, a diaphragm 102 of the speaker 101 oscillates along a direction 120 to cause forced air convection inside the housing 106 such that airflow is generated through the opening 106a along a direction 130. Once the opening 106a of the heat dissipation device 100 is directed towards a heat generating source (i.e. an integrated circuit), a heat dissipation purpose is achieved. In addition, a heat sink, i.e. a heat dissipation fin, is positioned within an area where the airflow along the direction 130 can reach (i.e. adjacent to the opening 106a) such that the overall dissipation efficiency can be enhanced.

In order to make the heat dissipation device 100 a silent one (i.e. does not make any sound), the diaphragm 102 of the speaker 101 oscillates within a frequency scope the human ear cannot hear, i.e. less than about 20 Hz or larger than about 20 KHz. In fact, the human ear hardly hear a frequency scope less than about 50 Hz, even less than about 100 Hz.

Although the speaker 101 has its original function of producing sound the human can hear, its diaphragm 102 materials may not necessarily be varied in this silent heat dissipation device. As long as the diaphragm 102 can oscillate properly within a frequency scope the human ear cannot or hardly hear, the diaphragm 102 materials can be the same as a common speaker's.

The speaker 100 structure is similar as speakers in general market. In particular, the diaphragm 102 includes a magnet 102a and the speaker 101 includes a magnetic inductive coil 104. In addition, the speaker 101 includes at least one opening 103 to allow the oscillation of the diaphragm 102 to induce airflow along the direction 130.

Figure 2:
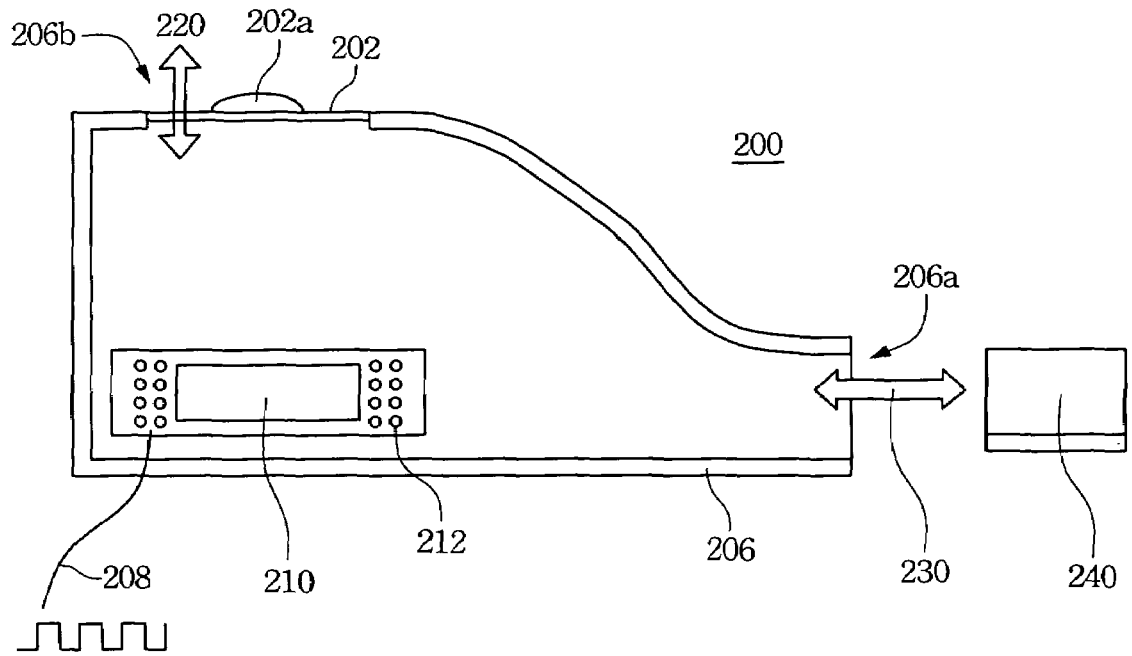
FIG. 2 illustrates a cross sectional view of a heat dissipation device according to another embodiment of this invention.

FIG. 2 illustrates a cross sectional view of a heat dissipation device according to another embodiment of this invention. This embodiment employs the same operation principle of last embodiment to provide another heat dissipation device 200. A housing 206 has an opening 206a and an opening 206b. A diaphragm 202 with a magnet 202a is disposed at the opening 206b. A magnetic circuit (including a ferrite 210 and a magnetic inductive coil 212 around the ferrite 210) operatively coupled with the diaphragm 202 is installed inside the hollow housing 206, and electrically connected to a frequency signal source by a signal cable 208.

When the magnetic circuit (the magnetic inductive coil 212) is electrified, i.e. by the frequency signal source, the diaphragm 202 oscillates along a direction 220 within a frequency scope the human ear cannot hear, i.e. less than about 20 Hz or larger than about 20 KHz. In fact, the human ear can hardly hear a frequency scope less than about 50 Hz, even less than about 100 Hz. Air inside the hollow housing 206 is forced to flow along the direction 230. A heat sink 240, i.e. a heat dissipation fin, is positioned within an area where the airflow along the direction 130 can reach (i.e. adjacent to the opening 206a) such that the overall dissipation efficiency can be enhanced.

Thus, the heat dissipation device of the present invention can provide forced air convection to achieve a heat dissipation function without making noises.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A silent heat dissipation device, comprising:
   a hollow housing, having a first opening and a second opening;
   a speaker disposed at the first opening, wherein the speaker includes a diaphragm oscillating within a frequency scope the human ear cannot or hardly hear so as to generate airflow through the second opening; and
   a heat sink disposed within an area where the airflow through the second opening reaches.

2. The heat dissipation device of claim 1, wherein the diaphragm comprises a magnet.

3. The heat dissipation device of claim 1, wherein the speaker comprises a magnetic inductive coil.

4. The heat dissipation device of claim 1, wherein the speaker comprises at least one opening, located within the hollow housing, to allow the oscillation of the diaphragm to induce the airflow through the second opening.

5. The heat dissipation device of claim 1, wherein the frequency scope the human ear cannot or hardly hear is less than about 20 Hz.

6. The heat dissipation device of claim 1, wherein the frequency scope the human ear cannot or hardly hear is larger than about 20 KHz.

7. The heat dissipation device of claim 1, wherein the heat sink is closer to the second opening than the first opening.

8. A silent heat dissipation device, comprising:
   a hollow housing, having a first opening and a second opening;
   a diaphragm having a magnet, the diaphragm being disposed at the first opening;
   a magnetic circuit means for oscillating the diaphragm within a frequency scope the human ear cannot or hardly hear, disposed inside the hollow housing, generating airflow through the second opening; and
   a heat sink disposed within an area where the airflow through the second opening reaches.

9. The heat dissipation device of claim 8, wherein the frequency scope the human ear cannot or hardly hear is less than about 20 Hz.

10. The heat dissipation device of claim 8, wherein the frequency scope the human ear cannot or hardly hear is larger than about 20 KHz.

11. The heat dissipation device of claim 8, wherein the heat sink is closer to the second opening than the first opening.

* * * * *